(12) United States Patent
Kidd et al.

(10) Patent No.: US 7,464,797 B2
(45) Date of Patent: Dec. 16, 2008

(54) CENTRIFUGAL BRAKES FOR WHEELS

(75) Inventors: Michael T. Kidd, Delton, MI (US); Gerald L. Cline, Delton, MI (US)

(73) Assignee: Jarvis/Pemco, Inc., Kalamazoo, MI (US)

( * ) Notice: Subject to any disclaimer, the term of this patent is extended or adjusted under 35 U.S.C. 154(b) by 194 days.

(21) Appl. No.: 11/379,499

(22) Filed: Apr. 20, 2006

(65) Prior Publication Data

US 2006/0207838 A1 Sep. 21, 2006

Related U.S. Application Data

(63) Continuation-in-part of application No. 11/080,290, filed on Mar. 15, 2005, now abandoned.

(51) Int. Cl.
*B60B 33/00* (2006.01)
*B60T 8/72* (2006.01)

(52) U.S. Cl. .................. 188/1.12; 188/82.8; 188/185

(58) Field of Classification Search ............. 188/1.12, 188/82.8, 82.84, 181 R, 181 A, 184, 185, 188/82.34; 301/6.1, 18; 192/219, 219.2, 192/219.3
See application file for complete search history.

(56) References Cited

U.S. PATENT DOCUMENTS 3,589,632 A * 6/1971 Rew ........................ 436/509
3,623,575 A * 11/1971 Joseph et al. .................. 188/31
3,987,832 A 10/1976 Funke
4,159,667 A * 7/1979 Nordstrom ..................... 411/7
4,323,047 A * 4/1982 McIntosh et al. ............... 124/1
4,678,087 A * 7/1987 York .......................... 211/70.5
4,848,522 A * 7/1989 Wolf ......................... 188/71.2
4,941,549 A * 7/1990 Da-Tan et al. ................ 182/234
5,002,163 A 3/1991 Kidd
5,456,336 A 10/1995 Bopp
5,579,873 A * 12/1996 Kohar et al. ............. 188/73.35
5,607,030 A 3/1997 Swift et al.
5,785,154 A 7/1998 Chen
6,070,701 A 6/2000 Hu
6,076,839 A 6/2000 Pao-Hung
6,332,513 B1 12/2001 Chuang
6,374,954 B1 4/2002 Cheng

* cited by examiner

*Primary Examiner*—Melody M Burch
(74) *Attorney, Agent, or Firm*—Miller Canfield; Timothy J. Engling

(57) ABSTRACT

A wheel assembly having a braking mechanism that is actuated by centrifugal force. The braking mechanism includes a rotating hub insert having a first pocket, a thread guard having a second pocket fixed relative to the frame of the wheel assembly, and an internal ball between the rotating hub insert and the thread guard. The internal ball can be flung by centrifugal force from the first rotating pocket to the second fixed pocket to cause a braking force from contact of the ball in the second pocket with the rotating hub insert. The amount of centrifugal force required to fling the ball into the second pocket can be calculated for rotation of the wheel greater than a certain predetermined speed.

5 Claims, 11 Drawing Sheets

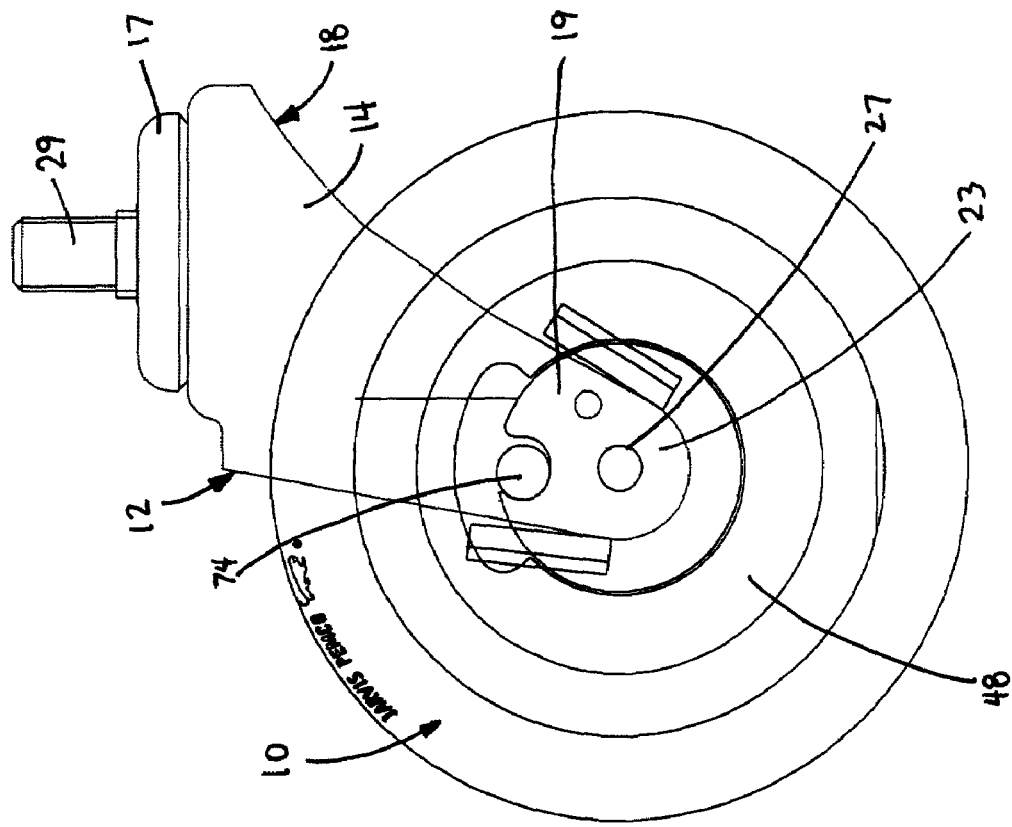

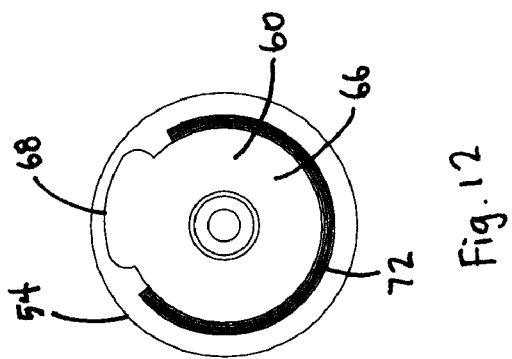
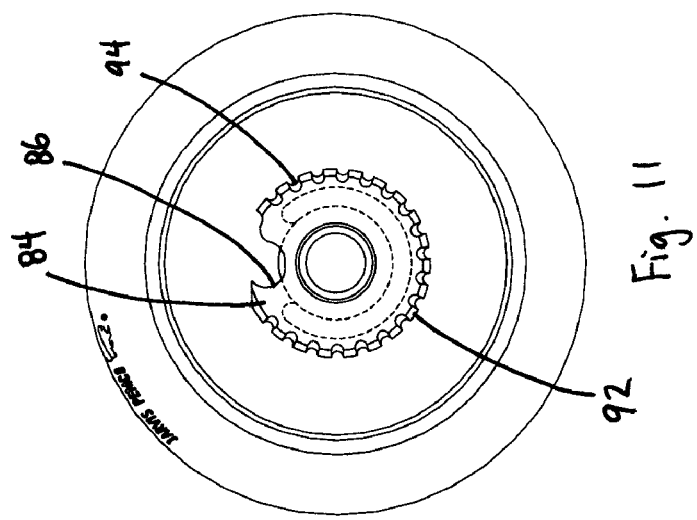
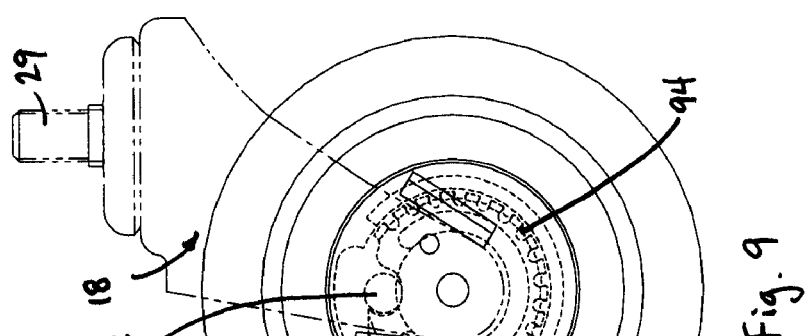
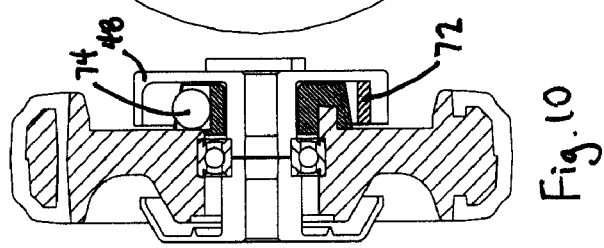

CENTRIFUGAL BRAKES FOR WHEELS

CROSS-REFERENCE TO RELATED APPLICATION

This application is a continuation-in-part of U.S. patent application Ser. No. 11/080,290, filed Mar. 15, 2005, (now abandoned), which is incorporated herein by reference.

BACKGROUND

The present disclosure relates to a braking mechanism in a wheel assembly that is actuated by centrifugal force. More particularly, the disclosure relates to a braking mechanism having an internal ball that is flung by centrifugal force from one rotating pocket to another pocket in association with the braking force.

Casters are wheels that are attached to carts or other objects to make them easier to move. Often, controlling the speed of the object using the casters is desirable. For example, shopping carts, furniture moving carts, trolleys, baby walkers, or wheelchairs may include braking mechanisms to slow the object or to minimize runaway carts. Damage or injury may occur if carts move too quickly or out of control. For example, an unattended shopping cart can roll into objects or people due to wind or an incline.

Certain brake mechanisms require a user to manually operate a brake. However, such manual brakes are often inconvenient, and the user cannot always be relied upon to set the brake when use of the cart is finished. Other mechanical brakes can operate automatically without user intervention. A braking mechanism that is actuated by centrifugal force created when the wheel is rolling faster than a certain predetermined speed is particularly advantageous for stopping runaway carts or to help maintain carts below a predetermined speed. The automatic operation avoids the necessity for the brake to be engaged or activated by the user of the cart.

The terms "brake" and "braking" as used in this disclosure include both slowing and stopping. The terms include reducing the speed of a cart as well as a stopping action. Certain other prior art brakes are meant to completely stop the rotation of a wheel, but in the present disclosure, "braking" is specifically intended to include slowing the rotation of the wheel.

Braking mechanisms that automatically operate are known in the art. Friction brakes, such as U.S. Pat. No. 5,002,163, are used for self-decelerating wheels. Additional types of devices including hooks, springs, brake shoes, brake pawls, ratchets, etc. have not always held up well in the field. Other patents disclose activation by centrifugal force or using an internal ball to assist with braking.

U.S. Pat. No. 3,623,575 discloses a wheel with a locking device including two movable locking members. A series of notches 8 are formed in the inner circular edge of a ring 9 of a wheel rim. Two balls 12 are each in opposing inclined tubular guideways. Each locking member engages when the floor is inclined so gravity causes the ball to roll into a notch. This stops and holds a cart from rolling downhill.

U.S. Pat. No. 5,607,030 discloses a centrifugal shopping cart brake that engages when a predetermined speed is reached. The braking mechanism is enclosed within the wheel and operates with rotating weights and ratchet assemblies. Sliding weights 4 are moved by centrifugal force against an object having spring resistance. In another example, at a predetermined speed, a tang 55 on an arm 54 engages ratchet teeth that transfers energy to a ring and friction band to slow the wheel. Alternately, in FIG. 15, a weight 61 on a lever arm rotates due to centrifugal force and pushes on an object having spring resistance.

U.S. Pat. No. 6,070,701 discloses a wheel having a roller 50 that operates in a semi-spherical half 30 of a wheel to act as a brake and reduce speed. The ball in between a stop piece 40 and the wall of the semi-spherical half of a wheel, and a slide way 42 has a variable width. When the wheel is rolled to a predetermined speed, the ball moves to the narrower width of the slide way, and the friction force of the ball on the stop piece/wall half acts as a braking force.

U.S. Pat. No. 6,076,839 discloses, as best seen in FIG. 3, a safety brake device using a ball. FIG. 3 with the ball is cited prior art to that patent, and FIG. 6 is the brake device of the '839 patent using a cylindrical pillar. FIG. 3 shows ball 18 inside an arched trough 17 of the ring groove 15. On each end of the trough are protruding arcs 23 of the fixed piece (block) 19 that form a tapered cavity narrower than the ball. When moving slowly, the ball remains in the lower wider portion of the arched trench. When the ball moves with centrifugal force, the friction of the ball against an arch 23 causes some braking action. FIG. 6 of the '839 patent shows a cylindrical pillar 43 in a space with an obliquely arched edge 47, wherein friction of the pillar against walls of the internal space have a narrowing arch.

U.S. Pat. No. 6,332,513 discloses a safety wheel having a ball 4 in an elongated trench 34 inside half of a wheel. The ball rolls to the lower end of the trench due to gravity when the wheel moves at slower speeds. The trench changes position when the wheel rolls. A side cover 5 has a stopping part 53 that does not rotate. At higher speeds, the ball does not roll to the lower end and stays in one end of the trench due to centrifugal force, and when this happens, the ball is stopped by the stopping part 53 and the wheel stops rolling.

U.S. Pat. No. 6,374,954 discloses a speed-control caster. A ball is in a chamber between the inner walls of two wheels on each side of an axle. The inner walls 22 are tapered forming a narrowing chamber for the ball, as seen in FIG. 5B. A braking effect occurs due to friction between the axle piece and the walls due to the rubbing of the ball when the ball is swept upward by the curves 23.

One aspect of many of these wheels is that the brakes completely stop rotation, rather than a slowing braking action. Also, others do not automatically disengage in one rotation of the wheel after decelerating below a predetermined speed, or the device must be stopped or reversed to disengage the brake.

These do not include a rotating insert with a pocket that flings a ball into a fixed pocket located in the wheel's thread guard that accepts the ball due to centrifugal force at a predetermined speed of the wheel, wherein the ball in the fixed pocket acts as a brake due to friction with an outer ring of the insert.

SUMMARY

The present invention is for centrifugal brakes for wheels using an internal ball that may be forced from a pocket by centrifugal force. A preferred wheel assembly includes a centrifugal brake having a ball, a rotating hub insert and a thread guard. The rotating hub insert has a pocket for a ball used in conjunction with a fixed pocket in the thread guard that accepts the ball due to centrifugal force at a predetermined speed. The term "pocket" in this disclosure is meant to broadly cover any receptacle, cavity or opening.

Instead of hooks, springs, brake shoes, brake pawls, or ratchets, the present disclosure uses a ball (i.e. ⅜ inch steel) in the wheel for the intended braking use. The simplicity of the design allows for increased durability and performance, while being less costly to make and quieter to operate than other designs.

The centrifugal brake in this disclosure automatically slows the wheel at a predetermined speed to avoid runaway carts and associated damage or injury. Also, the centrifugal brake may automatically disengage in one rotation of the wheel after decelerating below a predetermined speed or by reversing the wheel in the tension ring embodiment. The braking mechanism is internal so environmental conditions or debris cannot easily spoil, ruin, hamper, encumber or obstruct the wheel.

A pocket for the ball on the circumference of the rotating insert is used in conjunction with a fixed pocket located in the thread guard. In one embodiment, the rotating insert can be a tension ring with a brake pad.

As an example only, an intended use for the centrifugal brake for a wheel is for a shopping cart, but this is not meant to limit the invention because it is apparent that the centrifugal brake could be used for a baby walker, wheelchair or other objects. The centrifugal brake for a wheel can be designed to be used on a shopping cart to control the speed of a runaway cart. The wheel assembly includes a braking mechanism activated by centrifugal force created when the wheel is rolling faster than a certain predetermined speed, such as 3.5 miles per hour. The brake of the wheel engages at the predetermined speed and creates a braking motion to slow the wheel. The predetermined speed can be regulated for each use based on components used in making the wheel assembly. In one embodiment, the brake can automatically disengage when the speed of the cart is slowed below the predetermined speed and the cart has rolled for at least a full revolution of the wheel.

The braking force applied is weak enough to not impede the shopper or user who insists on walking faster than the predetermined speed, but it is strong enough to slow down an unattended shopping cart that is coasting in a parking lot to avoid or minimize damage from the cart hitting parked cars or other objects. Similarly, the centrifugal brake for a wheel can be used to control the speed of furniture moving carts on a ramp or baby walkers and wheelchairs on an incline.

As shown in the storyboard of FIGS. 13-20, the brake is activated when the speed of the wheel exceeds a predetermined speed, creating enough centrifugal force to fling the ball out of a pocket of the rotating insert into a fixed pocket located in the thread guard. One or both thread guards may include two anti-rotational ribs or stops on either side of the caster fork legs to keep the thread guard fixed relative to the legs. The ball may be then trapped and pinched between the thread guard and the insert's outer ring, which may preferably be made of soft polyurethane in one embodiment. The wheel will continue to roll, but the drag, friction or resistance of the trapped ball will slow the wheel as it is pushed over the soft polyurethane ring until the ball reaches the pocket of the rotating hub insert. If the wheel is still rolling too quickly, the ball will not drop back into the insert pocket, thereby starting another rotation of the braking action. When the wheel is traveling slower than the predetermined speed, the ball will drop back into the normal travel ball position in the insert pocket in one embodiment. In the tension ring embodiment, a reverse feature for disengaging the brake is an option.

The soft polyurethane material is abrasion-resistant and capable of deflecting with the ball, creating drag, and then springing back into its original shape. Polyurethane can be the same tough plastic material used for the thread guard and tread of the shopping cart wheel.

This particular embodiment discloses the use of a ball, such as the ⅜ inch steel ball as detailed, in conjunction with an insert ring adapted to work with the ball for braking action, but the ball could also include a variety of friction and anti-friction ball bearings, including different dimensions, sizes, materials, and weights. More or less friction, drag or resistance (braking force) can be generated by varying the interference fit of the ball with the polyurethane ring and the thread guard. Changing the diameter of the ring where the ball travels can change the speed required to centrifugally fling the ball out of the pocket, actuating the braking action. The weight and size of the ball can also affect the traveling speed when braking action occurs. The braking action slows motion by contact friction, but does not necessarily completely stop the rotation of the wheel.

An optional feature of adding serrations to the ring surface of the insert can produce a pulsing effect to help identify when the brake is engaged. The optional serrated insert could be made of compressible, abrasion-resistant polyurethane.

BRIEF DESCRIPTION OF THE DRAWING

The features of this disclosure and the manner of obtaining them will become more apparent, and the disclosure itself will be best understood by reference to the following description of embodiments of the brake for a wheel taken in conjunction with the accompanying drawing in which FIGS. 13-20 show a storyboard of the function and operation of the centrifugal brake, and others show particular embodiments of the centrifugal brake assemblies, wherein:

FIG. 1 shows a side view of an embodiment of a wheel assembly;

FIG. 2 shows a cross-sectional view of a wheel assembly through a vertical center axis;

FIG. 9 shows a side view of another embodiment of a wheel assembly having a damping material and serrations in the ring surface of the insert;

FIG. 10 shows a cross-sectional view of a wheel assembly having a damping material and serrations in the ring surface of the insert through a vertical center axis;

FIG. 11 shows a side view of a wheel with an insert having serrations in the ring surface;

FIG. 12 shows a thread guard having a dampening material;

FIG. 13 shows a wheel at rest or at travel slower than the predetermined speed with the ball resting in the pocket of the insert;

FIG. 14 shows the ball remaining in the pocket at rest or at travel slower than the predetermined speed;

FIG. 15 shows the ball approaching the fixed pocket;

FIG. 16 shows the ball being centrifugally flung out of the pocket of the insert into the fixed pocket of the thread guard;

FIG. 17 shows the ball being trapped and pinched between the thread guard and a ring surface of the insert;

FIG. 18 shows the ball being pushed over the ring surface of the insert;

FIG. 19 shows the ball reaching the pocket of the insert;

FIG. 20 shows the ball dropping back into the normal travel ball position in the pocket of the insert;

DETAILED DESCRIPTION

Figure 3:
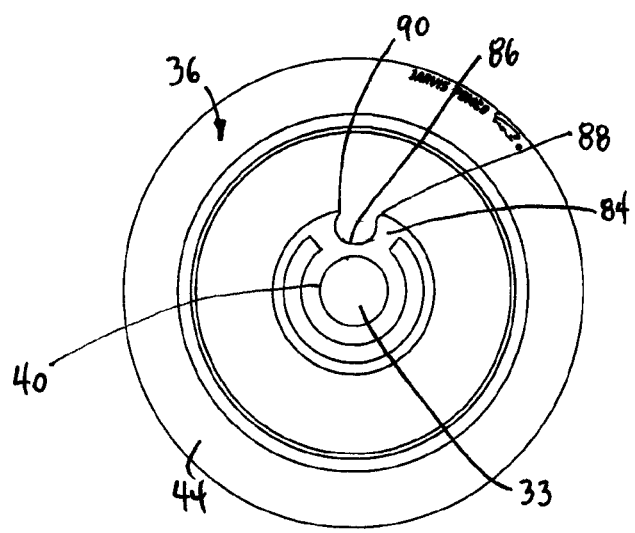
FIG. 3 shows a side view of a wheel, insert and dual sealed bearing.

While the present invention will be fully described hereinafter with reference to the accompanying drawings, in which particular embodiments are shown, it is to be understood at the outset that persons skilled in the art may modify the embodiments disclosed herein while still achieving the desired result. Accordingly, the description that follows is to be understood as a broad informative disclosure directed to persons skilled in the appropriate art and not as limitations of the present disclosure.

FIGS. 1 and 2 show a wheel assembly 10 as part of a caster 12 as often set between a pair of legs 14 and 16 connected by a base 17 of an inverted U-shaped frame 18 of which legs 14 and 16 are a part thereof. Preferably, the legs 14 and 16 extend away from the base 17 parallel to each other. The legs 14 and 16 preferably taper in width as they extend away from the base 17. The ends 19 and 21 of legs 14 and 16 may be semi-circular, forming substantially U-shaped end portions 23 and 25. Each end portion 23 and 25 has a hole 27 and 28 respectively concentric with the semi-circular ends 19 and 21. The base 17 of the frame 18 can be attached by a stem 29 extending therefrom to a shopping cart, furniture moving cart, trolley, baby walker, wheelchair or other objects with a potential for wheels. The stem 29 can also be threaded. The base 17 may be a plate for various types of attachment to objects.

The legs 14 and 16 straddle the wheel assembly 10 and a bolt 31 may extend through a pair of axially aligned holes 27 and 28 in the legs 14 and 16 and a hollow interior 33 of an axle 34 to render the wheel assembly 10 relatively rotatably supported on the frame 18. Preferably, the base 17 includes a swivel to permit free turning of the caster 12 relative to the cart or similar object. As such, the wheel 36 may rotate in one direction. The particular preferred frame is not meant to limit the invention, and "frame" may include a structure designed to hold the wheel 36.

Wheel 36 may include a hub 37 with a central opening 38. A bearing assembly 40 is preferably mounted in the opening 38, and the bearing assembly 40 is preferably dual sealed, as shown in the illustrative embodiment of FIG. 3. FIG. 10 shows a common 6002ZZ precision ball bearing. Regarding bearing assemblies, roller bearings carry heavier loads while ball bearings roll more easily but carry lesser loads. The wheel 36 can be rotatably supported on a cylindrical axle 34 by means of the bearing assembly 40. As such, the axle 34 can be part of the bearing assembly 40. The radial periphery 42 of the hub 37 preferably defines a tread mounting surface. The outer periphery 42 of the hub 37 may have synthetic resin tread 44 secured thereto. A moldable synthetic resin tread material, particularly polyurethane, may be used as the tread 44.

The thread guards 46 and 48 each have a circular hole 50 and 52 respectively. Thread guards 46 and 48 are on opposite sides of the wheel 36. As shown in FIG. 2, the small thread guard 46 may be made from a compressible or flexible nylon or similar wear-resistant material. The thread guard 48 forming a housing 54 is preferably made from a rigid nylon or similar wear-resistant material. Also, the thread guard 48 can be made of polyurethane as further detailed in the next paragraph. Holes 27 and 28 of the legs 14 and 16 are coaxially aligned with the holes 50 and 52 of the thread guards 46 and 48. The thread guards 46 and 48 are fixed against rotation relative to the frame 18. A bolt 31 may be inserted through a hollow interior 33 of the axle 34 and the sets of coaxially aligned holes 27 and 28 of the legs 14 and 16 are coaxially aligned with the holes 50 and 52 of the thread guards 46 and 48, respectively, so that the axle 34 is mounted upon the legs 14 and 16 of the frame 18. A nut 56 can be screwed on the threaded end of the bolt 31 in order to prevent removal of the bolt 31 from the frame 18.

Figure 4:
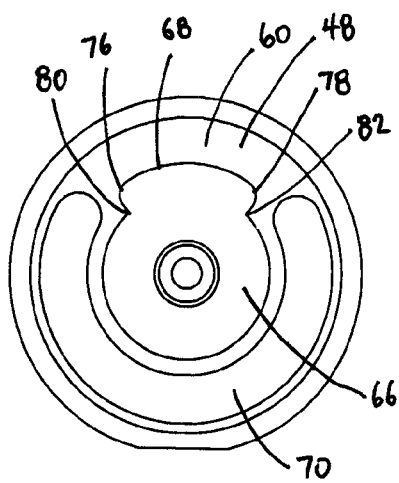
FIG. 4 shows an inner side view of a thread guard.
Figure 5:
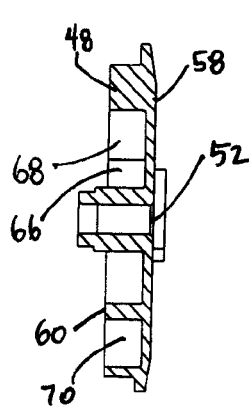
FIG. 5 shows a cross-sectional view of a thread guard through a vertical center axis.
Figure 6:
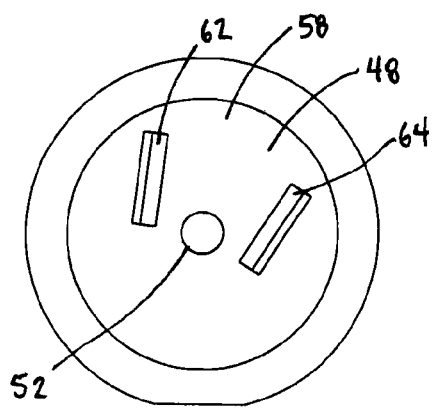
FIG. 6 shows an outer side view of a thread guard.
Figure 8:
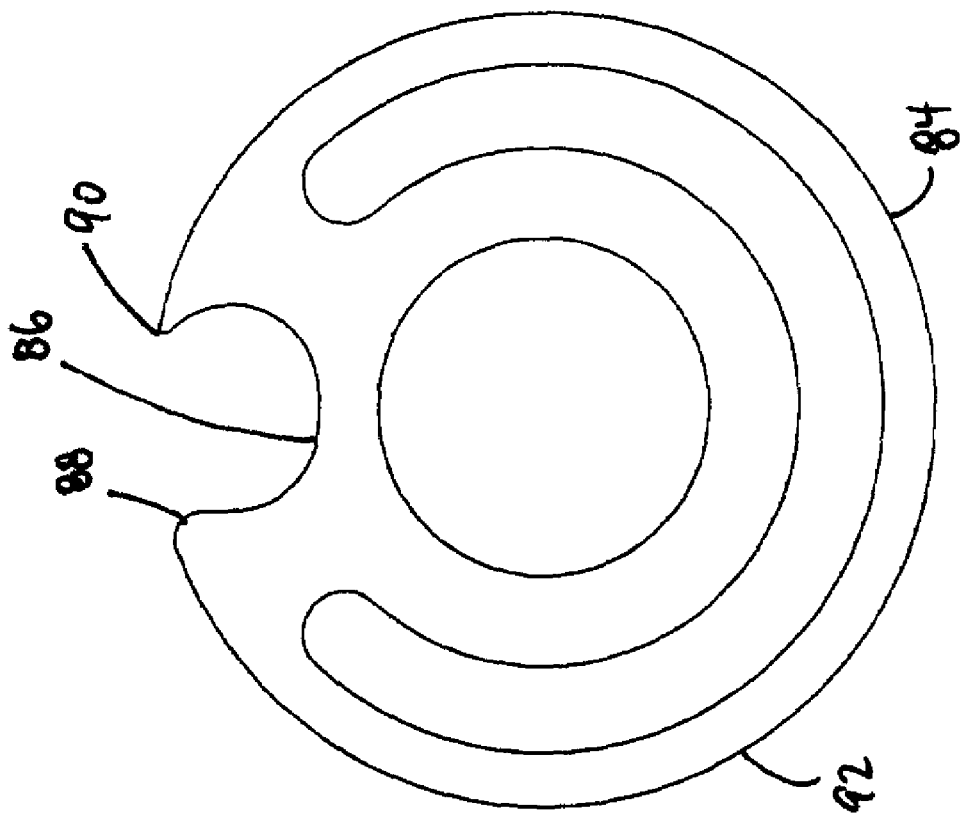
FIG. 8 shows a side view of an insert.
Figure 7:
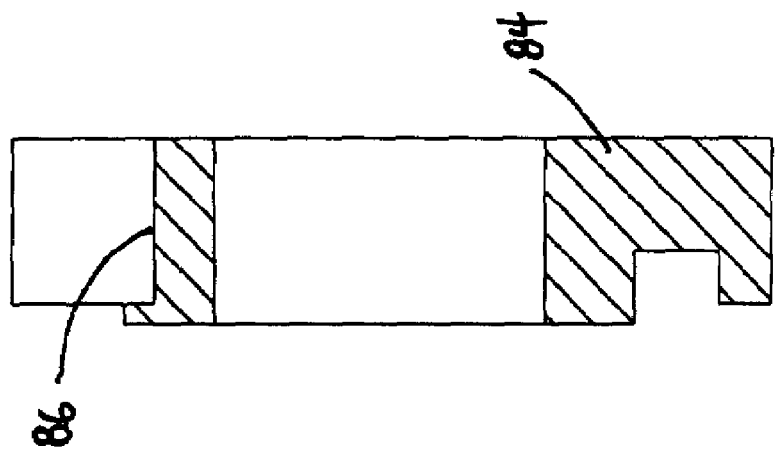
FIG. 7 shows a cross-sectional view of an insert through a vertical center axis.

The thread guard 48 forming the housing 54 has an outer side 58 as shown in FIG. 6 and an inner side 60 as shown in FIG. 4. The outer side 58 preferably forms a circle extending to the outer periphery 42 of the hub 37 to minimize contamination of the wheel 36. The outer side 58 may have stops 62 and 64 on each side of end 19 of the leg 14 to keep the thread guard 48 fixed relative to the leg 14. The inner side 60 may have a recessed area 66 with a fixed pocket 68, which preferably remains at the top of the thread guard 48. The thread guard 48 may also include a semi-circular groove 70 on the inner side 60 as shown in FIG. 4 and a dampening material 72 as shown in FIGS. 10 and 12. As an option, a soft material can be adhered or molded to the inside of the thread guard 48 to absorb the clack of the ball 74 as the wheel 36 rotates. Similarly, the thread guard 48, itself, can be made of soft polyurethane that absorbs the sound or clack of the ball 74 when the wheel 36 is rolling under normal conditions. Preferably, this soft material is an elastomer that dampens sound and eliminates the clack and rattle of the moving ball 74. The groove 70 may extend around a portion of the thread guard 48 to form a wall as the portion of the perimeter of the recessed area 66 that does not include the fixed pocket 68. As shown in FIG. 12, the thread guard 48 can form a housing 54 without a groove and smaller than the outer periphery 42 of the hub 37.

The fixed pocket 68 may have rounded ends 76 and 78 forming corners 80 and 82, respectively. The area of the fixed pocket 68 between rounded ends 76 and 78 is sufficient to hold the ball 74, but the pocket 68 is preferably shallower in the radial depth from the hole 52 than the diameter of the ball 74 in one embodiment. Thus, the ball 74 extends slightly from the pocket 68 when the ball 74 is in the pocket 68. The fixed pocket 68 is preferably about 80-90 degrees (shown at 87 degrees in the drawings) of the perimeter of the recessed area 66. The fixed pocket 68 is preferably at the top of the recessed area 66 so gravity will allow the ball 74 to drop from the fixed pocket 68 under the appropriate circumstances. Also, in operation, the ball 74 can be forced up against gravity (flung) by centrifugal force into the fixed pocket 68.

In the wheel assembly 10, a rotating insert 84 can be attached to the hub 37 or can be part of the hub 37. The rotating insert 84 is preferably located inside the recessed area 66 of the thread guard 48. The rotating insert 84 has a pocket 86. The insert pocket 86 is of sufficient size to hold the ball 74, and the insert pocket 86 may be the same depth as the diameter of the ball 74 or preferably slightly deeper. The insert pocket 86 may include a leading edge 88 and a trailing edge 90. The leading edge 88 is preferably somewhat rounded with a slope into the pocket 86. The trailing edge 90 may form a lip so the pocket 86 forms a cup with a partial circumference similar to the ball 74. The trailing edge 90 forming a lip is preferred for a wheel 36 designed to rotate in one direction, such as for swivel casters. Edges 88 and 90 can both be rounded with a slope into the pocket 86 for a wheel designed to rotate in both directions.

The outer radial surface of the insert 84 can be called the brake ring surface 92, which is adapted to work with the ball 74 for braking action. The brake ring surface 92 extends from edge 88 to edge 90 around the portion of the insert 84 not including the pocket 86. The ball 74 can be trapped and pinched between the thread guard 48 and a brake ring surface 92 of preferably soft polyurethane, which is capable of deflecting due to the ball 74, creating drag, friction, or resistance, and then springing back into its original shape. More or less drag, friction, or resistance (braking force) can be generated by varying the interference fit of the ball 74 with the brake ring surface 92 and the thread guard 48. The brake ring surface 92 can include constant surface of the insert 84, an inserted semi-circular band, or similar circular objects with an aperture in the center. An optional feature of adding serrations 94 to the brake ring surface 92 can produce a pulsing effect to help identify when the brake is engaged. The brake ring surface 92 with optional serrations 94 could also be made of compressible, abrasion-resistant polyurethane.

The ball 74 can be flung by centrifugal force from the insert pocket 86 to the fixed pocket 68 in association with the braking force. The ball 74 remains internal to the wheel assembly 10 between thread guard 48 and insert 84. For the shopping cart embodiment, a ⅜ inch steel ball is disclosed, but the ball 74 could also include a variety of friction and anti-friction balls, including different dimensions, sizes, materials, and weights. The ball 74 optionally may be lightly lubricated with grease or silicone to diminish the build up of frictional heat.

A slight amount of lubricant can be added to the components to increase their life and to avoid unwanted frictional wear to the components. A lubricant may also help avoid the potential of components sticking and may help reduce noise.

Figure 13:
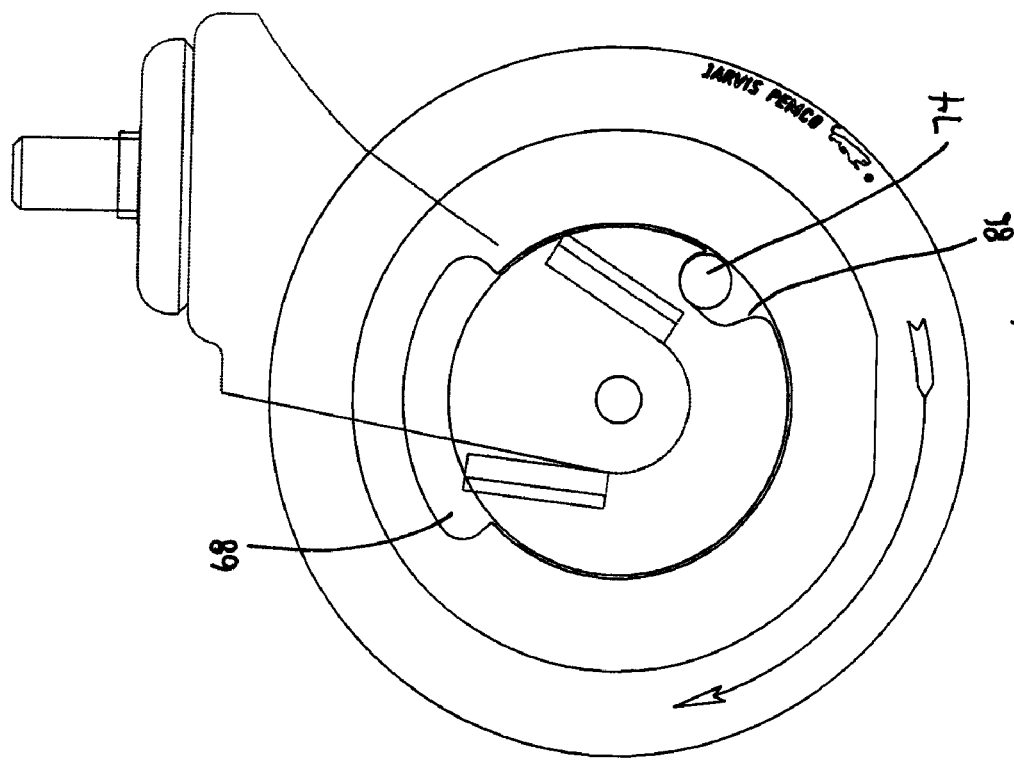
Figure 14:
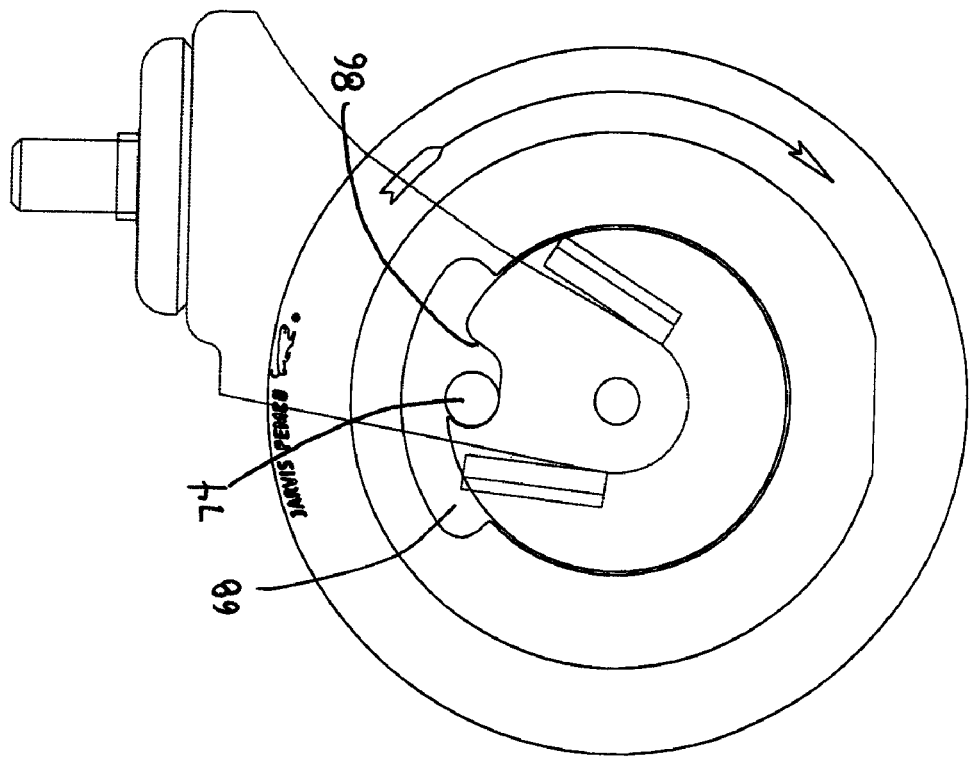
Figure 15:
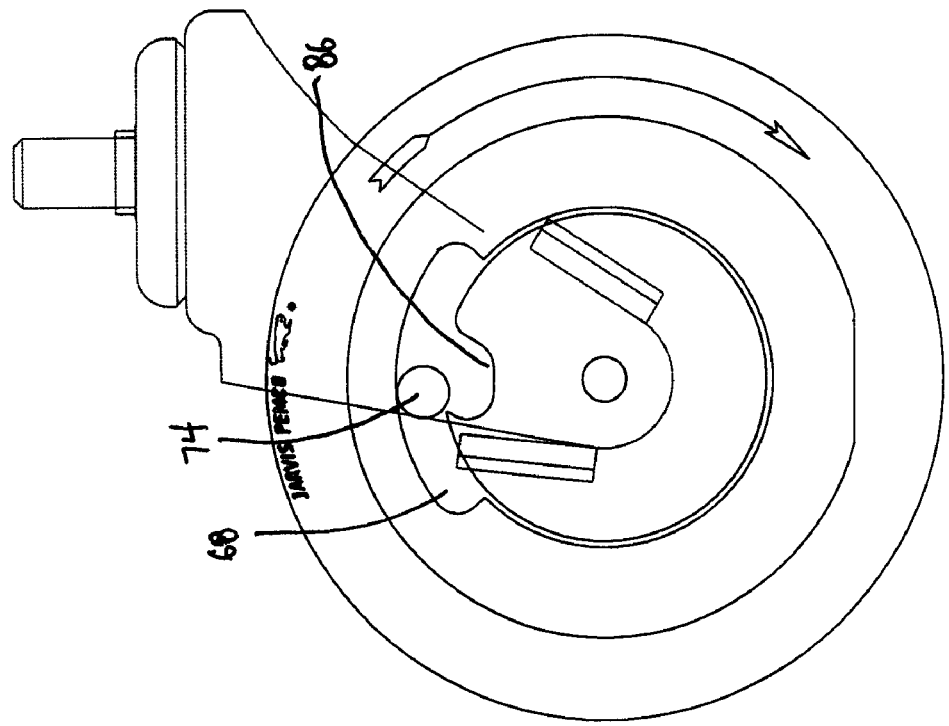
Figure 16:
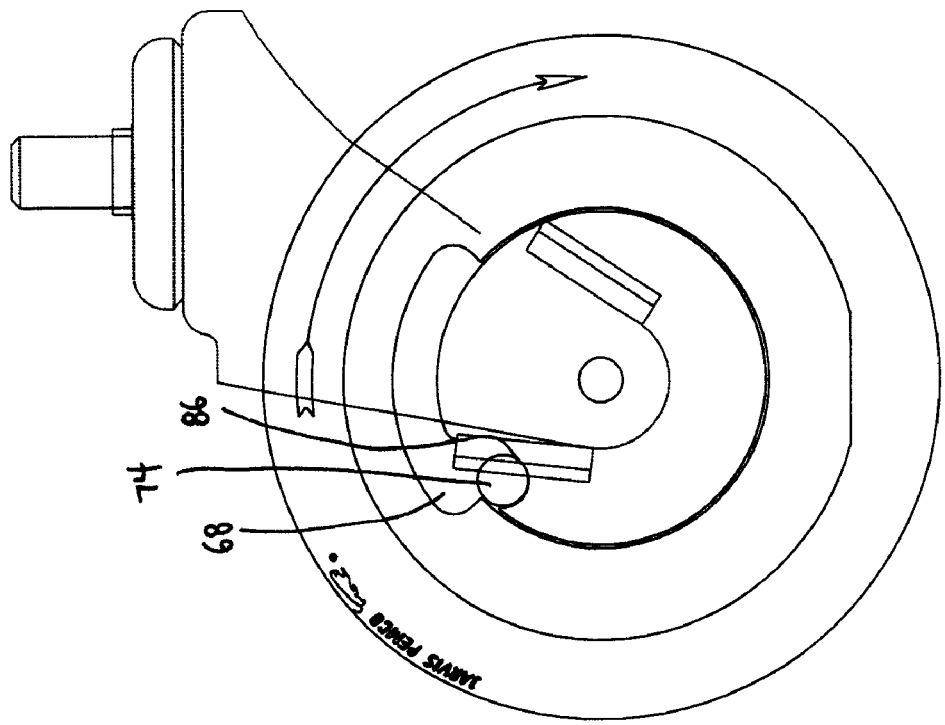
Figure 18:
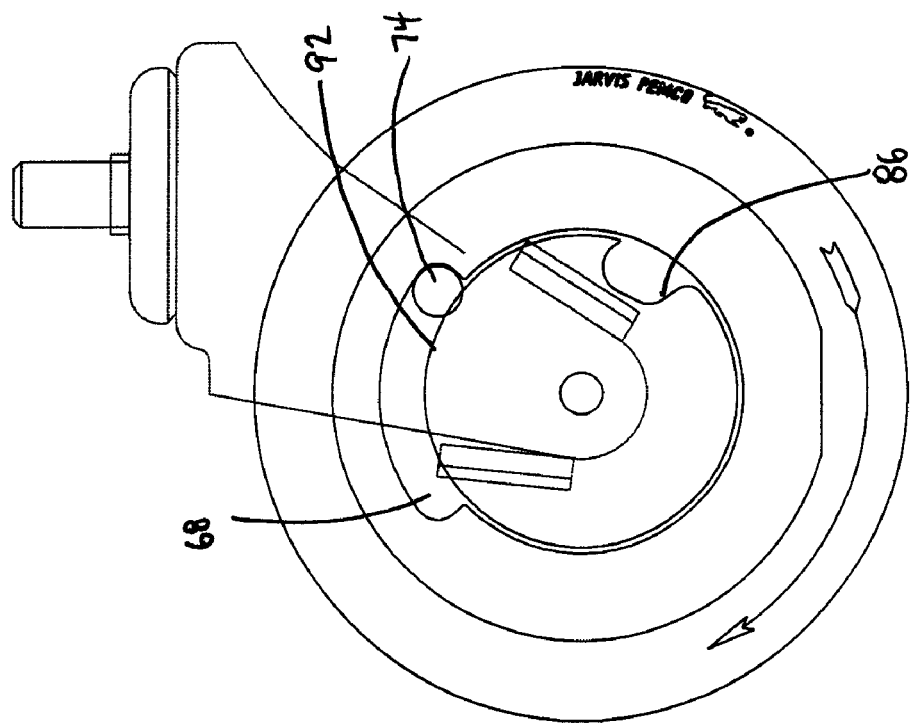
Figure 17:
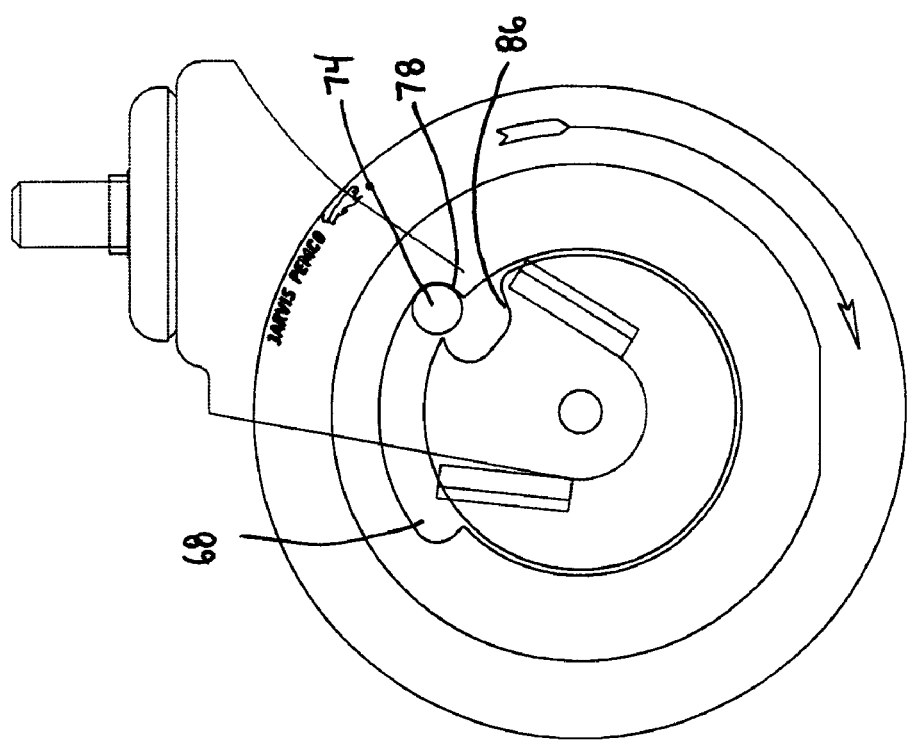
Figure 19:
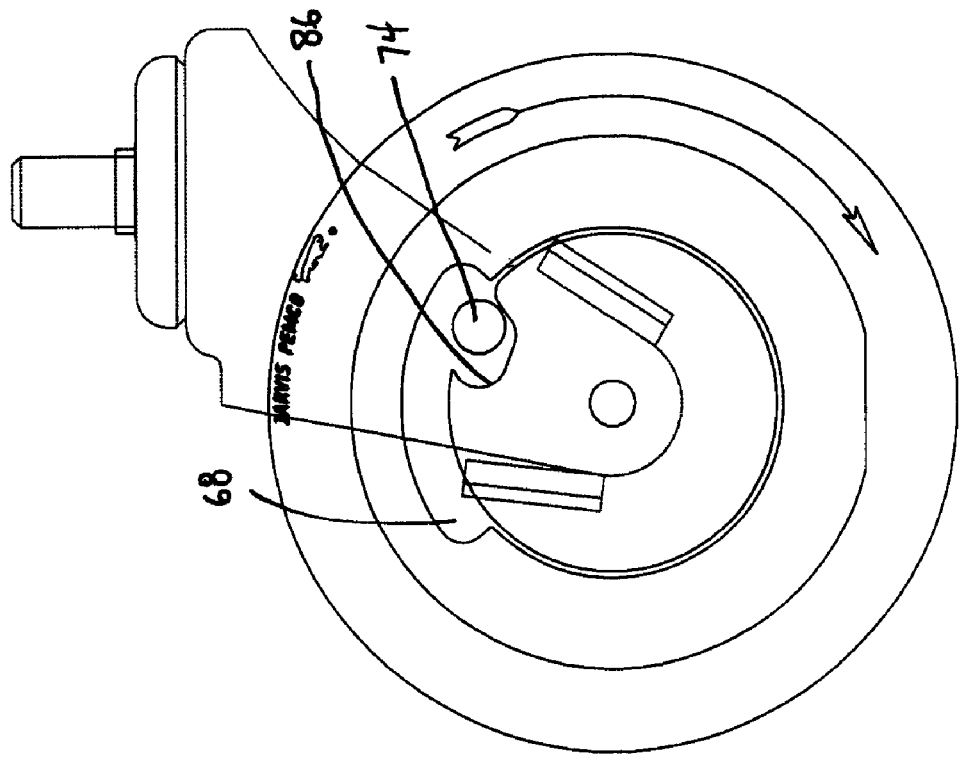
Figure 20:
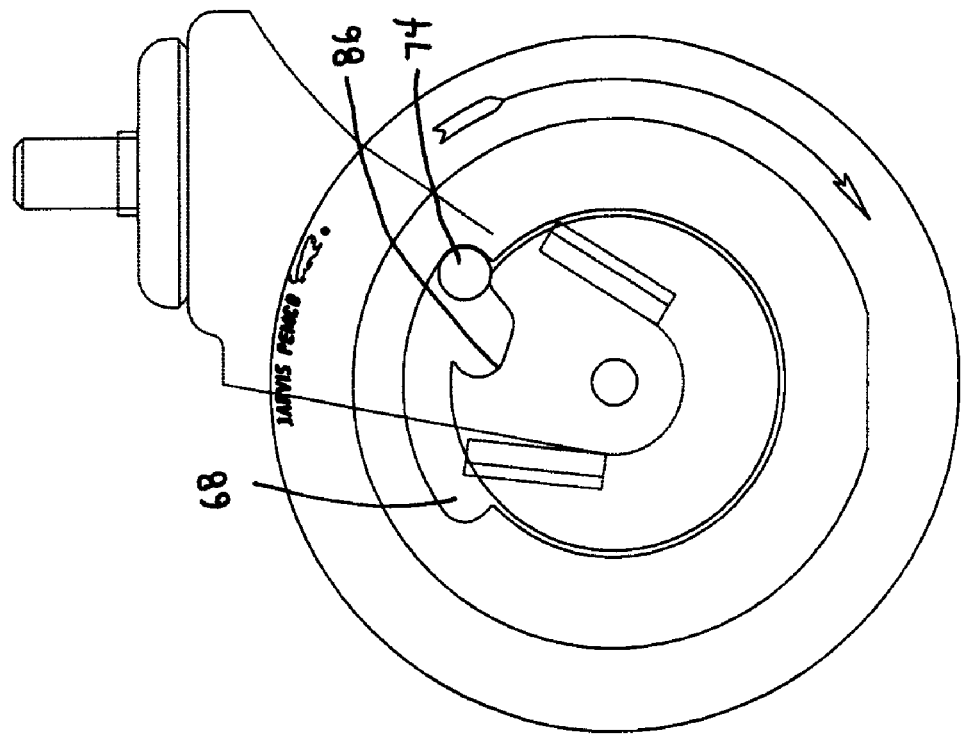

The illustrative embodiment of FIGS. 13-20 shows how the braking action of a wheel 36 works when the speed of the wheel 36 exceeds a predetermined speed, creating enough centrifugal force to fling the ball 74 out of a pocket 86 of the rotating insert 84 into a fixed pocket 68 located in the thread guard 48. FIG. 13 shows the wheel 36 at rest or traveling at a rate slower than the predetermined speed. In those conditions, the ball 74 rests in the pocket 86 of the insert 84. FIG. 14 shows the ball 74 remaining in the pocket 86 at rest or traveling at a rate slower than the predetermined speed. In FIG. 15, the ball 74 approaches the fixed pocket 68. In FIG. 16, the ball 74 is centrifugally flung out of the pocket 86 of the insert 84 into the fixed pocket 68 of the thread guard 48, such as when the wheel 36 is moving faster than the predetermined speed. In FIG. 17, the ball 74 is then trapped and pinched between the thread guard 48 and a brake ring surface 92 of the insert 84. The ball 74 is shown in the rounded end 78. As shown in FIG. 18, the wheel 36 will continue to roll, but the drag, friction, or resistance of the trapped ball 74 will slow the wheel 36 as the ball 74 is pushed over the brake ring surface 92, at least until the ball 74 reaches the pocket 86 of the insert 84, as shown in FIG. 19. If the wheel 36 is still rolling faster than the predetermined speed, the ball 74 will not drop back into the pocket 86 of the insert 84, thereby starting another rotation of the braking action. When the wheel 36 is traveling slower than the predetermined speed, the ball 74 will drop back into the normal travel ball position in the pocket 86 of the insert 84, as shown in FIG. 20.

In a preferred embodiment, a self-actuating tensioner wheel assembly 110 operates with a slower more gradual braking action that stays engaged until the wheel 136 comes to a complete stop, for a preferred use with a shopping cart. The self-actuating tensioner wheel assembly 110 includes many features of the wheel assembly 10 and centrifugal brake function described above or has similar features (as shown in FIGS. 21-30 with reference numerals 100 higher). The self-actuating tensioner wheel assembly 110 includes a sliding inner tension ring 184 and an optional reversing feature to disengage the brake.

Figure 21:
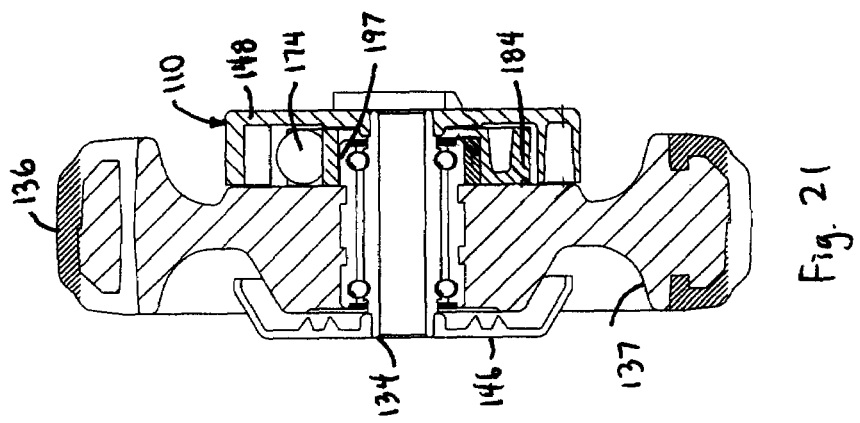
FIG. 21 shows a cross-sectional view of a wheel assembly having a tension ring.

FIG. 21 shows a cross-sectional view of a tensioner wheel assembly 110 having a tension ring 184 between a hub 137 of the wheel 136 and a thread guard 148. Another thread guard 146 is preferably on the opposing side of the wheel 136 from the thread guard 148. The ball 174 is located between the thread guard 148 and the tension ring 184. As shown, the ball 174 is at rest in the unengaged position in a pocket 186 of the tension ring 184.

Figure 23:
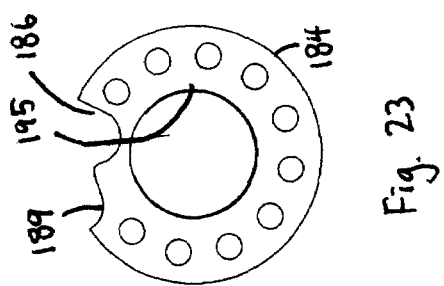
FIG. 23 shows a side view of a tension ring component.
Figure 22:
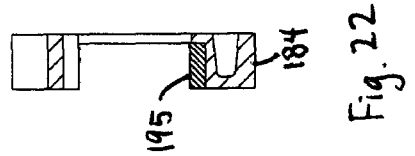
FIG. 22 shows a cross-sectional view of a tension ring component.

FIGS. 22 and 23 show the tension ring 184 having the pocket 186 that is deep enough to accommodate the ball 174 and further show an illustrative lock shelf 189 that is less deep than the diameter of the ball 174. The tension ring 184 includes a brake pad 195 around at least a portion of the inner circumference of the tension ring 184. The brake pad 195, which is preferably replaceable after being worn out, extends from the inner circumference of the tension ring 184 to contact the axle 134, such as a ball bearing housing 197. The tension ring 184 is preferably rigid and made of nylon or a similar material, and the brake pad 195 is preferably flexible and made of polyurethane. The tension ring 184 preferably holds the brake pad 195 in compression around the ball bearing housing 197. The use of polyurethane is preferred because it is durable and abrasion-resistant and maintains its spring-like quality under compression. By altering the diameter of the polyurethane brake pad 195 or adjusting its thickness, customized centrifugal brake wheel assemblies can be made for light or heavy loads (i.e. different size shopping carts) or for various field applications. Some parking lots only need a light braking action to resist the push from a stiff wind on a flat parking lot. Other parking lots have steeper inclines where the weight of the shopping cart can create runaway shopping carts when left unattended, requiring strong braking action.

Figure 25:
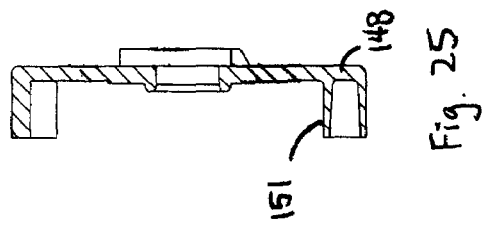
FIG. 25 shows a cross-sectional view of a thread guard through a vertical center axis.
Figure 24:
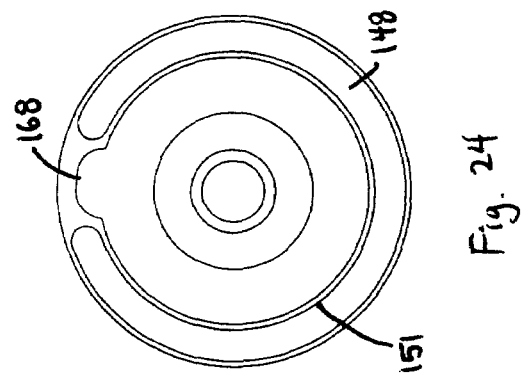
FIG. 24 shows a side view of a thread guard.

FIGS. 24 and 25 show the thread guard 148 having a fixed pocket 168 on the top and an inner thread guard wall 151 adjacent to the fixed pocket 168 and around a remaining interior circumference of thread guard 148. The thread guard 148 is preferably made of polyurethane to help deaden sound from movement of the ball 174. Use of soft polyurethane, or similar material, for the thread guard 148 can reduce the sound or clack of the ball 174 when the wheel 136 is rotating under normal conditions. The ball 174 needs to be free to float as the wheel 136 rotates to allow the ball 174 to engage in the fixed pocket 168 at the top of the thread guard 148, preferably at a designed actuation speed of 3 to 4 mph.

Figure 28:
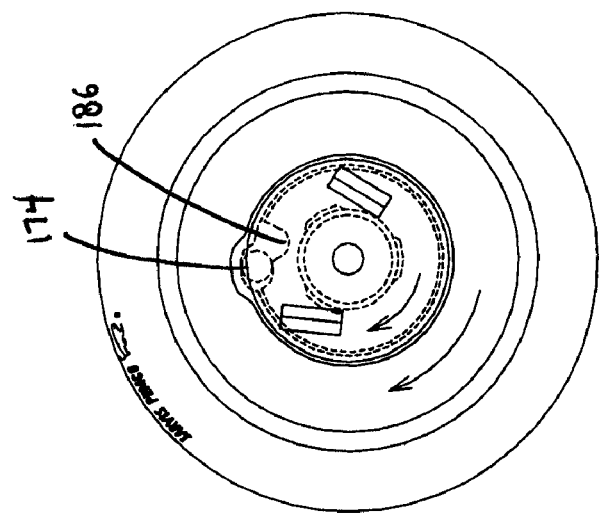
FIG. 28 shows the ball on the lock shelf of the tension ring in a locked position.
Figure 27:
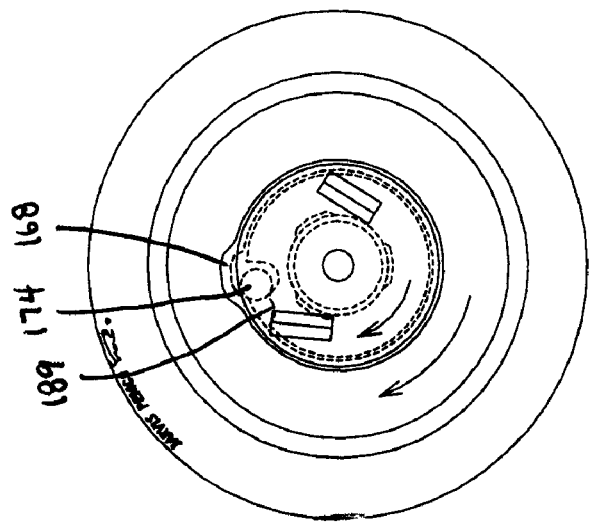
FIG. 27 shows the ball remaining in the pocket.
Figure 26:
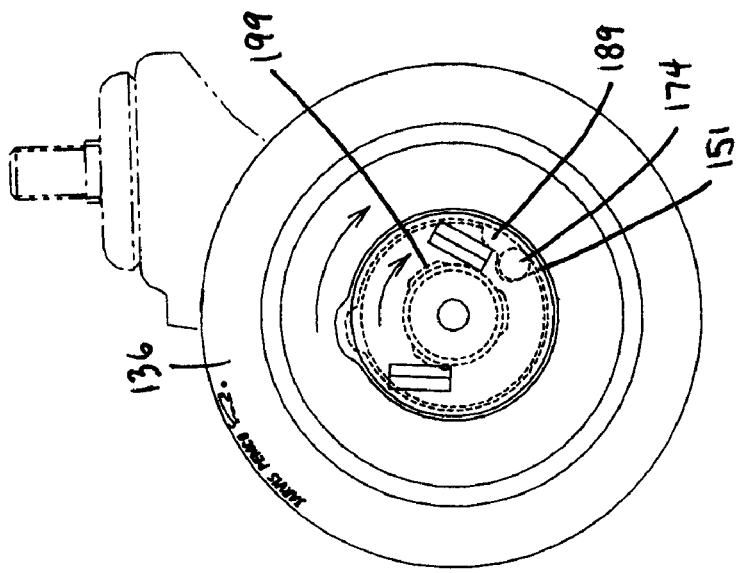
FIG. 26 shows the ball in the pocket of the tension ring riding along an inner thread guard wall.

As shown in FIGS. 26 through 29, the ball 174 operating under centrifugal force allows the wheel 136 to turn freely at low speeds. FIG. 26 shows the ball 174 in the pocket 186 at slow speeds with the ball 174 riding along the inner thread guard wall 151. FIG. 27 shows that the ball 174 can remain in the pocket 186 at low speeds or can enter the fixed pocket 168 if forced upward. When the speed becomes fast enough, the centrifugal action forces the ball 174 into the fixed pocket 168 in the thread guard 148 to form a locked position. As shown in FIG. 28, the ball 174 is on the lock shelf 189 of the tension ring 184. With the ball 174 in the locked position in the thread guard 148, the tension ring 184 can be held in place. Then a brake pad 195 preferably on an inner portion of the tension ring 184 begins to slide, providing constant braking action for the wheel 136 to bring the wheel 136 to a slow controlled stop. This tension ring 184 is preferably slightly press-fit over the ball bearing housing 197, and the friction from the tension ring 184 spinning around the ball bearing housing 197 slows down the cart or similar article until it comes to a complete halt.

Figure 30:
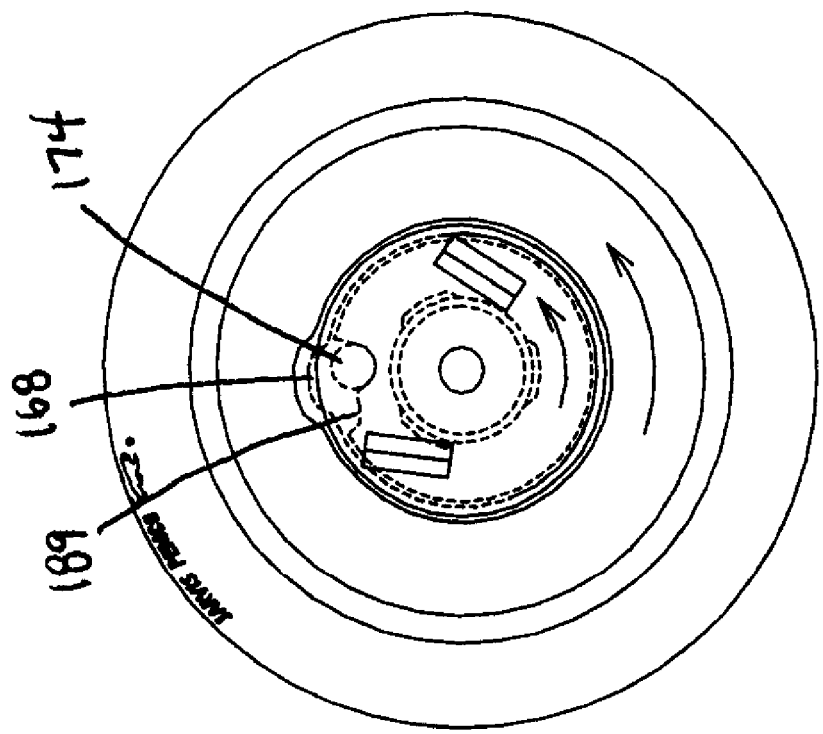
FIG. 30 shows reversing feature to disengage the brake wherein reversing the wheel allows the ball to fall into the pocket of the tension ring in a resting position.
Figure 29:
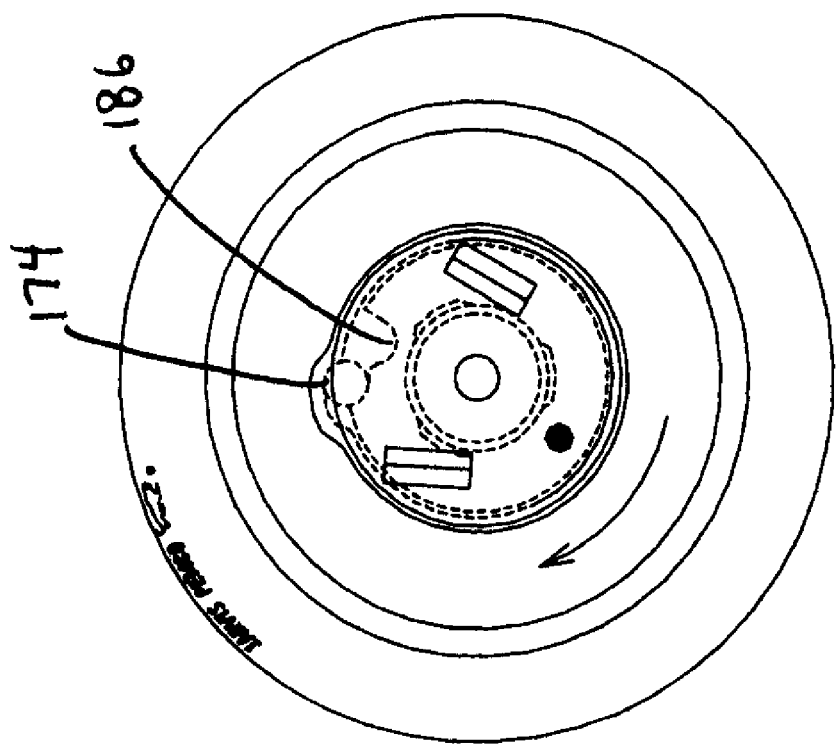
FIG. 29 shows the ball in the locked position wherein the tension ring is held in place.

As shown in FIG. 30, reversing the wheel approximately ¼ to ½ inch will allow the ball 174 to fall back into the pocket 186 in a resting position. This will disengage the brake action, and the wheel 136 will return to its normal non-brake operation.

In addition to the centrifugal action, tension for a controlled stop, and reversing feature to disengage the brake, FIGS. 26-30 show a spring pocket 199, three as shown, immediately adjacent to the preferred ball bearing housing 197, to smooth the operation of the wheel 136. The spring pockets 199 are reliefs in the tension ring 184 to allow the tension ring 184 to deform when pressed onto the ball bearing housing 197. Three spring pockets 199 add spring tension to the tension ring 184 causing the tension ring 184 to resemble more of a triangle after being pressed onto the ball bearing housing 197. As the three spring pockets 199 wear down, the triangular shape returns to its original round shape while maintaining a consistent load or tension on the ball bearing housing 197.

The self-actuating tensioner wheel 136:
  Rolls as easily as a standard ball bearing shopping cart wheel when not actuated
  Requires no field adjusting, and can be totally factory preset
  Can be preset with higher torque for large shopping carts or lighter torque for small carts or for different parking lot grades
  Can be actuated for speeds of approximately 3.5 mph
  Can be designed to actuate in a parking lot only, not in a store
  Can be made with heavy duty components for durability and long life
  Can be safely used with power cart pushers
  Can be mounted on front swivels or rear rigid brackets with the recommended two casters per cart
  Can be installed with nut and axle bolt or riveted axle
  Creates light tension on wheel when actuated to slowly bring runaway shopping carts to a safe and gentle halt
  Can be easily deactivated by backing up the wheel a ¼-inch in a preferred embodiment.
  Automatically actuates on windsailing shopping carts to bring them to a safe and gentle stop.

The braking force applied when the brake is engaged can be light enough to easily push through for the persistent or rushed user, but strong enough to stop an empty runaway cart in a parking lot. Even when actuated the shopping cart is as easy to push as carts equipped with full-time tensioner casters (friction brakes). The self-actuating tensioner wheel 136 is designed for a 5" diameter shopping cart wheel, however, this design can easily be adjusted to handle other sized wheels or other material handling equipment.

Although preferred embodiments of the disclosure are illustrated and described in connection with particular features, it can be adapted for use with a wide variety of wheels. Other embodiments and equivalent assemblies, brakes, balls, and wheels are envisioned within the scope of the claims. Various features of the disclosure have been particularly shown and described in connection with illustrated embodiments. However, it must be understood that the particular embodiments merely illustrate and that the invention is to be given its fullest interpretation within the terms of the claims.

What is claimed is:

1. In a wheel assembly including a frame and a wheel, the wheel assembly having a braking mechanism that is activated by centrifugal force, the braking mechanism comprising:
  a tension ring having a first pocket and a brake pad;
  a thread guard having a second pocket fixed relative to the frame; and
  an internal ball between the tension ring and the thread guard;
  a ball bearing housing in a center of the wheel and adjacent to the brake pad of the tension ring;
  wherein the internal ball can be flung from the first pocket to the second pocket by centrifugal force to cause a braking action when the internal ball is in the second pocket.

2. The wheel assembly of claim 1 further comprising a spring pocket in the tension ring adjacent to the ball bearing housing.

3. The wheel assembly of claim 1 wherein the brake pad is around at least a portion of an inner circumference of the tension ring.

4. A self-decelerating wheel assembly with a braking mechanism that is actuated by centrifugal force, the wheel assembly comprising:
  a frame;
  a wheel that rotates relative to the frame;
  a tension ring having a first pocket, a lock shelf adjacent the first pocket, and a brake pad around at least a portion of an inner circumference of the tension ring;
  a thread guard having a second pocket at a top of the thread guard fixed relative to the frame; wherein the second pocket of the thread guard is above the tension ring, and
  a single internal brake ball between the tension ring and the thread guard;
  a ball bearing housing in a center of the wheel and adjacent to the brake pad of the tension ring;
  wherein the braking mechanism is actuated by centrifugal force created when the wheel is rolling faster than a certain predetermined speed wherein the internal brake ball can be flung from the first pocket to the second pocket by centrifugal force in association with a braking action when the internal brake bail is in the second pocket.

5. The wheel assembly of claim 4 further comprising a series of spring pockets in the tension ring adjacent to the ball bearing housing.

\* \* \* \* \*